Aug. 15, 1939.  T. MARSHALL, JR  2,169,844
PROCESS AND APPARATUS FOR INCREASING FUEL EFFICIENCY
OF INTERNAL COMBUSTION ENGINES
Filed Feb. 19, 1936

CONTAINS INERT
GAS, I.E., HELIUM,
OR NEON, OR
ARGON, OR KRYPT-
ON, OR XENON, OR
MIXTURES THER-
EOF.

Inventor
Thomas Marshall Jr.
by Parker & Carter
Attorneys.

Patented Aug. 15, 1939

2,169,844

UNITED STATES PATENT OFFICE 2,169,844

PROCESS AND APPARATUS FOR INCREASING FUEL EFFICIENCY OF INTERNAL COMBUSTION ENGINES

Thomas Marshall, Jr., Chicago, Ill.

Application February 19, 1936, Serial No. 64,642

4 Claims. (Cl. 123—119)

This invention relates to a process and apparatus for obtaining a more complete explosion of the fuel in the cylinders of internal combustion engines and has for its object to provide a new and improved process and apparatus of this description. The invention has as a further object to provide a process and apparatus by means of which the efficiency of the internal combustion engine will be greatly increased and a much larger percentage of the fuel mixture burn in each cylinder.

It has been heretofore believed that the heat content of the ignition spark applied to the fuel in the cylinders of internal combustion engines was the main cause of the combustion of the fuel. An additional effective result is produced by certain components of the gas becoming ionized, ionization playing an important role in the degree of combustion of the fuel. I have found that a much more complete combustion of the fuel in the cylinders may be secured by introducing into the cylinders, in addition to the air and hydrocarbon compounds forming the fuel, a supply of readily ionizable gas or gases, so that when the spark occurs this readily ionizable gas or gases being distributed throughout the fuel, are instantaneously ionized and a much greater proportion of the fuel burned at each operation of the spark, and it is a further object of the invention to provide a process and apparatus for carrying this into effect.

The invention has further objects which are more particularly pointed out in the accompanying description.

Figure 1:
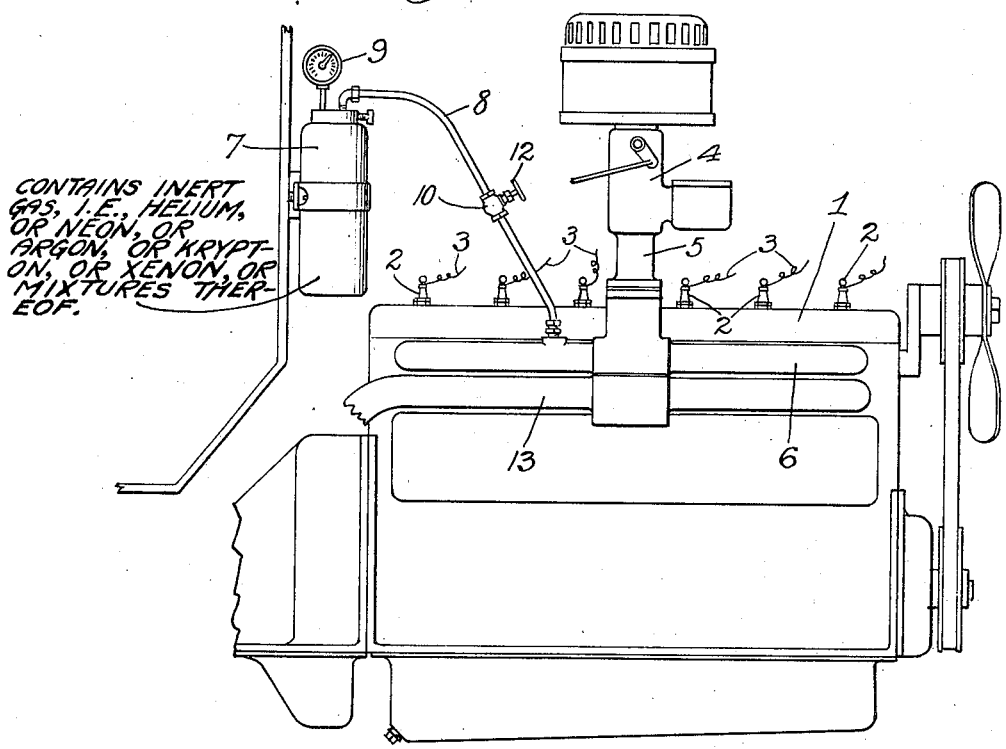
Figure 2:
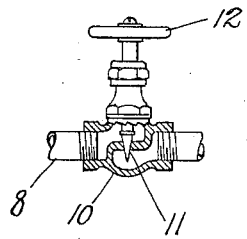

Referring now to the drawing, Fig. 1 is a view showing one form of device embodying the invention;

Fig. 2 is a view of the throttling valve illustrated in Fig. 1 for throttling the ionizable gas;

Like numerals refer to like parts throughout the several figures.

Referring now to the drawing, I have illustrated an internal combustion engine embodying the apparatus and carrying out the process of this invention. It is of course evident that the invention may be used in connection with any internal combustion engine, such as those now in use, including Diesel engines. In the construction shown there is illustrated an internal combustion engine 1 having a plurality of cylinders for the fuel, the cylinders being provided with the spark plugs 2, connected in circuit by the conductors 3. In this construction I have illustrated the ordinary internal combustion engine having the carburetor 4 connected by a pipe 5 with the intake manifold 6 of the engine so that the hydrocarbon mixture containing air is conducted to the cylinders of the engine.

I provide means for introducing into the cylinders of the engine after the fuel charge is introduced, a readily ionizable gas which is in addition to the ordinary fuel mixture and which may be introduced into the cylinders in any desired manner. Common gases of this type, for example, would be argon, neon, krypton, xenon, helium, or any other suitable gas which is readily ionizable. For purposes of illustration, I have shown a container 7 for containing this readily ionizable gas and which is connected by a pipe 8 with the intake manifold 6 of the engine, so that the pull of the engine that draws in the fuel will also draw in this gas and the gas will be thoroughly mixed with the fuel when in the cylinders. In order to occupy a reasonably small space so as to last for a long period, I prefer to put the gas in container 7 under a high pressure and I provide a pressure guage 9 so that the pressure may be always indicated and the operator may know when a new supply of gas is required. It takes only a small amount of gas in each cylinder and when the gas is under high pressure I provide some suitable means for throttling the admission of the gas to the cylinders to limit it to the small amount desired. Any suitable means for this purpose may be used. For the purposes of illustration I have indicated a throttling valve 10 in the pipe 8 between the container 7 and the intake manifold 6. This throttling valve, see Fig. 2, may be of any suitable description and for the purposes of illustration I have simply shown it as a needle valve having the needle valve element 11 cooperating with a conical shaped seat and controlled by a handle 12 and which can be moved to reduce the admission of the gas to any desired amount, depending upon the pressure in the container and the suction of the engine.

In carrying out the process the proper readily ionizable gas is placed in the container and the throttle valve 10 regulated as desired to provide a sufficient amount of the readily ionizable gas to be mixed with the fuel and drawn into the cylinders, and when the spark occurs ionization occurs substantially throughout all the fuel in the cylinders of the engine and the fuel is burned instead of being discharged through the exhaust manifold 13, as is the case in the engine as now used. By means of this invention, instead of burning a comparatively small amount of the fuel, in the neighborhood of 40%, as is now the case, a much larger percentage of the fuel is actually used and burned in the cylinders, in the neighborhood of 80% to 90% of the fuel, and hence there is a great saving of fuel and an increase in efficiency of the engine.

I have described in detail a particular process and apparatus for carrying out the invention, but it is of course evident that various other means may be utilized than those herein illustrated and I therefore do not limit myself in the claims hereto appended embodying the invention to the particular means illustrated and described. In certain of the claims, for example, I have used the gases helium and neon, but with the understanding that any equivalent gas used in the process will come within the terms of such claims.

I claim:

1. The combination with an internal combustion engine having cylinders and ignition devices of means for introducing into the cylinders in addition to the fuel mixture of air and hydrocarbon compounds, readily ionizable gas krypton which mixes with the fuel in the cylinders and is ionized when the ignition occurs, whereby the amount of fuel burned in the cylinders is increased.

2. The combination with an internal combustion engine having cylinders and ignition devices of means for introducing into the cylinders in addition to the fuel mixture of air and hydrocarbon compounds, readily ionizable gas, such as helium, which mixes with the fuel in the cylinders and is ionized when the ignition occurs, whereby the amount of fuel burned in the cylinders is increased.

3. The combination with an internal combustion engine having cylinders and ignition devices, of a source of ionizable inert gas separate from the engine and independent of the engine exhaust, means for introducing into the cylinders in addition to the fuel mixture of air and hydrocarbon compounds, an ionizable inert gas from said separate source which mixes with the fuel in the cylinders and is ionized when the ignition occurs, whereby the amount of fuel burned in the cylinders is increased.

4. In combination, an internal combustion engine having an ignition system and combustion chambers, comprising means for introducing an inert ionizable gas free from carbon dioxide gas into the combustion chambers with the fuel mixture, said inert gas ionizing when ignition of the fuel mixture occurs, whereby the amount of fuel burned in the cylinders is increased.

THOMAS MARSHALL, Jr.